United States Patent
Bertoldo et al.

(10) Patent No.: US 10,889,453 B2
(45) Date of Patent: Jan. 12, 2021

(54) TRANSFER WHEEL AND METHOD FOR TRANSFERRING OBJECTS

(71) Applicant: PHILIP MORRIS PRODUCTS S.A., Neuchatel (CH)

(72) Inventors: Massimiliano Bertoldo, Castelmaggiore (IT); Nicolo Tonegutti, Casalecchio di Reno (IT)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 16/495,945

(22) PCT Filed: May 15, 2018

(86) PCT No.: PCT/EP2018/062427
§ 371 (c)(1),
(2) Date: Sep. 20, 2019

(87) PCT Pub. No.: WO2018/210775
PCT Pub. Date: Nov. 22, 2018

(65) Prior Publication Data
US 2020/0140210 A1  May 7, 2020

(30) Foreign Application Priority Data
May 16, 2017 (EP) .................................. 17171290

(51) Int. Cl.
*B65G 47/84* (2006.01)
*B65G 47/74* (2006.01)
*A24C 5/32* (2006.01)
*A24D 3/02* (2006.01)

(52) U.S. Cl.
CPC ............ *B65G 47/848* (2013.01); *A24C 5/327* (2013.01); *A24D 3/0216* (2013.01); *B65G 2201/027* (2013.01); *B65G 2201/0226* (2013.01)

(58) Field of Classification Search
None
See application file for complete search history.

(56) References Cited

U.S. PATENT DOCUMENTS

| 5,605,432 A | 2/1997 | Fink |
| 5,996,768 A | 12/1999 | Boyce |

(Continued)

FOREIGN PATENT DOCUMENTS

| DE | 102011010954 | 8/2012 |
| DE | 102011007428 | 10/2012 |

(Continued)

OTHER PUBLICATIONS

PCT Search Report and Written Opinion for PCT/EP2018/062427 dated Jul. 26, 2018 (15 pages).

*Primary Examiner* — Kavel Singh
(74) *Attorney, Agent, or Firm* — Mueting Raasch Group

(57) ABSTRACT

Transfer wheel (1) for transferring objects (40, 41) comprises at least a seat module (3). The seat module comprises a seat (2) located at the peripheral face of the transfer wheel and adapted for accommodating an object on the seat. The at least one seat module is a resilient seat module, wherein a position of the seat of the seat module is adaptable in radial direction of the transfer wheel. Also provided is a method for transferring objects.

17 Claims, 2 Drawing Sheets

(56) References Cited

U.S. PATENT DOCUMENTS

| | | | | |
|---|---|---|---|---|
| 6,644,460 B2* | 11/2003 | Gertitschke | ............ | B65B 5/103 |
| | | | | 198/392 |
| 2011/0109110 A1 | 5/2011 | Sarda | | |
| 2012/0115697 A1 | 5/2012 | Punzius | | |
| 2015/0291301 A1* | 10/2015 | Cadieux | ................ | A24C 5/327 |
| | | | | 156/185 |

FOREIGN PATENT DOCUMENTS

| | | |
|---|---|---|
| DE | 102011102696 | 11/2012 |
| EP | 0616874 | 9/1997 |
| EP | 1663634 | 6/2013 |
| EP | 2659794 | 11/2013 |
| EP | 2408323 | 8/2014 |
| GB | 1585761 | 3/1981 |

* cited by examiner

TRANSFER WHEEL AND METHOD FOR TRANSFERRING OBJECTS

This application is a U.S. National Stage Application of International Application No. PCT/EP2018/062427 filed May 15, 2018, which was published in English on Nov. 22, 2018 as International Publication No. WO 2018/210775 A1. International Application No. PCT/EP2018/062427 claims priority to European Application No. 17171290.4 filed May 16, 2017.

The present invention relates to a transfer wheel for transferring objects, an apparatus comprising such a wheel and a method for transferring objects.

Objects are, for example, rupturable capsules with liquid content used in filters of smoking articles, alternatively in segments of aerosol-generating articles where tobacco material is heated to form an aerosol. Capsules for the use in smoking articles are known in the art. When transferring capsules from a reservoir to, for example, a continuous tow of filter material according to known methods, the capsules are transferred between different rotating wheels. Variations in the size of capsules may exist, either intended or due to manufacturing. Due to such intended, random or statistical distribution of sizes the capsules may fit better or worse on a seat in a wheel. Where a capsule is larger than a seat, a capsule tends to get deformed or crushed. Where the capsule is smaller than a seat, a vacuum applied to the seat may not be sufficient to securely hold the capsule on the seat such that the capsule may not safely be transferred or may get lost.

It is thus desirable to have a transfer wheel and a method for a safe transfer of rupturable capsules. In particular, there is need for a transfer wheel and a method for transferring objects having different sizes.

According to the invention there is provided a transfer wheel for transferring objects. The transfer wheel comprises at least a seat module comprising a seat located at the peripheral face of the transfer wheel and adapted for accommodating an object on the seat. The seat module is a resilient seat module wherein a position of the seat in the seat module is adaptable in radial direction of the transfer wheel. The position of the seat module is automatically adaptable such that a radial position of the seat is adjusted, for example depending on different sizes of an object accommodated on the seat. For example, the position of the seat or of the seat module is moved to a more radially central position when a larger object is accommodated on the seat of the seat module. The position of the seat or of the seat module is moved to a more radially circumferential position when a smaller object is accommodated on the seat of the seat module. Preferably, the seat module is automatically adapted such that a maximum radial extension of the transfer wheel defined by an outermost extension of an object on the seat of the seat module is kept constant.

When transporting objects on a wheel and, for example, transfer the objects from wheel to another wheel, one half of an object is typically accommodated on a seat of the wheel. The object is transferred to another wheel by the other half of the object being inserted into a seat of the other wheel. The half of the object formerly accommodated on the seat of the first wheel now projects from the circumference of the other wheel. Such an arrangement where preferably half of the volume of an object is accommodated on a seat guarantees a secure and safe transfer of an object as well as a secure hold on a seat before and once transferred.

If the object is inserted into a material, for example into a continuous tow of material, the position of the object is defined by the position of the wheel relative to the material.

A seat basically is a recess in the peripheral face of the transfer wheel. A seat preferably provides a form fit for an object received on the seat for best accommodation of the object and to provide an exactly defined position of the object. Preferably, a position of the object is exactly defined in radial direction. More preferably, the position of the object is exactly defined in a radial direction as well as in a lateral direction.

The object may have a preferred orientation or for example a symmetry axis or symmetry plane, for example a rotational axis, such as for example, cylindrical objects, cones, pyramids, cuboidal objects or polygons. These objects are preferably arranged on the seat with the preferred orientation or the symmetry axis of the object radial with the transfer wheel.

An object larger than a mean size may get damaged, for example by the seat or may get lost because it does not neatly fit on the seat. A larger object may extend further out of the seat than intended such that it may more easily get caught on apparatus parts or may be squeezed between two seats of adjacent wheels or between guides surrounding the wheel. A smaller object may become buried in the seat and be positioned in a retracted position (set back in view of the peripheral face of the transfer wheel). A transfer may possibly not occur due to insufficient forces sucking the object from the seat.

In the transfer wheel according to the invention, the radial position of the seat is automatically adapted through the provision of a resilient seat module in order to make up for a difference in the size of the object on the seat in radial direction. For example, the resilient seat module is compressed or relaxed. Thereby, the seat module adopts a position such that the seat of the seat module is set to a defined radial position. This defined radial position of the seat is adapted by a variable compression of the seat module.

Advantageously, the maximum radial extension of the transfer wheel defined by an outermost extension of the spherical object on the seat of the transfer wheel is kept constant independent on the size of the object on the seat, by varying the radial position of the seat of the resilient seat module.

Varying the radial position of the seat may be achieved by varying the radial position of the seat module or by varying the position of the seat in the seat module, thus relative to the position of the seat module.

The transfer wheel according to the invention provides security in preserving an object during its transfer. It provides flexibility in intentionally using objects having different sizes, including also different shapes, without having to change a transfer wheel or seats in the transfer wheel. Thus, a same apparatus may be used for differently sized objects. Any downtime due to changes in apparatus parts, in particular of transfer wheels may be reduced or completely omitted. Possibly even higher operation speed of an apparatus is available without the risk of damaging or loosing objects.

The resilient seat module may, for example, be elastically mounted, for example, on an elastic module support. The elastic module support may be reversibly compressible, for example such as a spring element. Advantageously, the spring element is in the form of a coil spring. Preferably, the elastic module support is in the form of a separate element.

The elastic module support may, for example, be made of an elastically compressible material, for example a sponge mat or rubber sheet.

An elastically mounted seat module may itself be rigid or elastic. Preferably, an elastically mounted seat module is rigid.

Alternatively or in addition, the resilient seat module may be elastically compressible. For example, the resilient seat module comprises elastically compressible material or is made of elastically compressible material.

The resilient seat module may be a combination of an elastically mounted module and being elastically compressible.

Preferably, a compression force of the resilient seat module is between about 1 Newton and about 10 Newton, more preferably, a compression force of the resilient seat module is between about 2 Newton and about 8 Newton, most preferably a compression force of the resilient seat module is between about 2 Newton and about 5 Newton.

Preferably, a compression force of the resilient seat module is smaller than a crushing force of an object to be transferred. For example, a compression force is between about a seventh (1/7) and about two thirds (2/3) of a crushing force of an object. For example, a compression force is about half (1/2) of the crushing force of the object.

As a general rule, whenever the term 'about' is used in connection with a particular value throughout this application this is to be understood such that the value following the term 'about' does not have to be exactly the particular value due to technical considerations. However, the term 'about' used in connection with a particular value is always to be understood to include and also to explicitly disclose the particular value following the term 'about'. Typically, variations of plus-minus 5 percent of the value are included in the "about" value.

The term "objects" as used in connection with the present invention denotes objects that have a geometrical shape with well-defined external boundaries, such as for example spherical, ellipsoidal, lentil- or pill-shaped objects. Therein, pill-shaped objects include cylinders having a circular or oval diameter and at least a convex top or convex bottom side. Further possible embodiments of objects according to the invention are shapes with a single axis of symmetry, for example, cylindrical objects, conical objects, frustoconical objects, torroid objects, egg-shaped objects, and combinations thereof. Further possible embodiments of objects according to the invention are parallelepiped shapes for example, cubes, cuboids, pyramids, frustopyramids and combinations thereof. Further possible embodiments of objects according to the invention are objects without any particular shape, for example random geometrical shape, some of which could be described with the shape of fruit, like for example, pear-shaped, tomato-shaped, apple-shaped or potato-shaped.

By way of example, objects include objects which are entirely made of solid state substances, objects having a shell made of a solid substance enclosing a liquid or gaseous core, objects like gelatin capsules and objects made of a matrix material, for example a sponge-like material. The object according to the invention may be elastic, deformable and crushable if a sufficiently high force is applied.

If the object is an exact spherical or substantially spherical object, preferably, the object has a diameter between about 0.5 millimeter (mm) and about 6.5 mm. More preferably, the object has a diameter between about 2.5 mm and about 4.0 mm.

If the object has a width and a length, for example a cylinder, conical object or polygon, then the width corresponds to the largest possible diameter of the object. These objects preferably have a width between about 3 mm and about 7.8 mm. More preferably, the object has a width between about 4 mm and about 5 mm.

The length corresponds to the height of an object, for example the height of a cylinder, a cuboid or a frustopyramid. Preferably, these objects have a length between about 3 mm and about 18 mm. More preferably, the object has a length between about 4 mm and about 10 mm.

A length of an object is typically arranged in radial direction of the transfer wheel.

In case of a frustoconical, frustopyramidal or parallelepipedal shape a width of a top of the object is preferably between 1 mm and 3 mm.

Preferably, the object is a capsule. Preferably, the capsule comprises a liquid. Preferably, the liquid is flavorant, for example, menthol. Preferably, the capsule is crushable, that is, the capsule can release its content when a sufficient crushing strength is applied. With like objects, it is particularly important to handle the objects carefully as not to release the liquid within the capsules during the transfer process. Typical crushing forces of capsules are 10 Newton or more. Thus, preferably an apparatus or the method according to the invention allows contact forces between capsules or between capsules and apparatus parts below 5 Newton.

Preferably, a seat to accommodate a capsule has a size which is larger than a diameter or a width of the object to be accommodated.

Preferably, a seat has a size to accommodate all object of a specific size, for example diameter or width, including statistical deviations due to manufacturing tolerances. For these applications a seat has preferably a size, for example diameter or width, corresponding to an object mean size, for example mean diameter or mean width, plus one to two sigma standard deviations. While soft objects may possibly be more tolerant in view of a seat not being exactly adapted to the shape and size of the object, hard solid objects are generally less tolerant in view of a seat not adapted to the shape and size of the hard object. Thus, a seat of a seat module intended for accommodating hard objects preferably has a size, preferably diameter or width, corresponding to an object mean size, preferably mean diameter or mean width, plus two sigma standard deviations. For a seat of a seat module intended for accommodating soft objects it may be sufficient to have a size corresponding to an object mean size plus one sigma standard deviation only.

In applications where sizes of objects to be transferred are intentionally varied, such a variation in size is typically larger than a statistical deviation of a defined size. Thus, in applications where sizes of objects are intentionally varied, a seat preferably has a size, preferably, diameter or width, corresponding to a mean size, for example mean diameter or mean width, of the object to be transferred plus 10 percent.

For example, a seat adapted for receiving an object having a diameter of 3.1 mm, preferably also allows accommodating an object having a diameter of 3.3 mm.

Due to the adaption of the position of the objects via the seat module to keep a maximum radial extension of the object on the wheel constant, also a smaller object may be transferred on a seat intended for the transfer of larger objects. For example, a seat adapted for receiving and accommodating an object having a diameter of 3.2 mm, preferably also allows accommodating and the transfer of an object having a diameter of 3.0 mm.

Preferably, a size, in particular a diameter or width, of a seat is between about 1 mm and about 8 mm, preferably, between about 2 mm and about 4.5 mm.

Preferably, the seat has a size to hold half the volume of an object accommodated on the seat. Thus, preferably, a spherical object is inserted in a seat up to its equator.

Preferably, a seat has an exact or substantially semispherical shape. For example, the seat has a shape of a semi-sphere, a semi-ellipsoid or a semi-lentil.

For non-spherical objects, preferably the seat has a shape and size to accommodate the object to about half of its height on the seat. Preferably, the seat is adapted in its shape to the shape of the non-spherical object. For example, a seat preferably has a cuboidal or cylindrical shape for accommodating a cuboidal or cylindrical object. Seat walls may be constructed to widen versus a top of a seat module where the seat is arranged in, in order to facilitate the accommodation of the object in the seat.

Preferably, the seat has a cup-shape. A seat with a cup-shape encompasses shapes such as, for example, half-spheres or half-cuboids. A seat with a cup-shape is adapted to hold capsules or similar objects basically of any form that such a capsule may have.

Preferably, objects are kept in a seat by suction. Suction may be applied at the seat through an opening in the seat, preferably in a central or annular portion of the seat. The opening may be an opening to a passage leading to the inside of the transfer wheel, where suction is applied, for example by a vacuum pump.

Preferably, the transfer wheel comprises a central or annular orifice and at least a passage in communication with the central or annular orifice and the peripheral face of the transfer wheel. In such embodiments, the transfer wheel further has a vacuum port in communication with the seat via the at least one passage for applying suction to the seat for retaining the object on the seat.

Preferably, the transfer wheel according to the invention comprises a plurality of seat modules. Each seat module of the plurality of the seat modules comprises a seat for accommodating an object on the seat. Preferably all seats of a transfer wheel have a same size for receiving same-sized objects. However, the seats of the plurality of seats of a transfer wheel may have different sizes. For example, every other seat of a transfer wheel may have a same size.

Preferably, a plurality of different sets of seat modules is provided, wherein a set of seat modules comprises seat modules for all seats of the transfer wheel. For example, a first set of seat modules are designed for objects having a mean average size of 3.0 mm and a second set of seat modules are designed for objects having a mean average size of 3.5 mm. Providing a plurality of sets of seat modules allows to cover a large number of different sizes of objects with intended different dimension, unintended different dimension, with a fluctuation in dimensions and combinations thereof.

Preferably, the seat modules of the plurality of seat modules are arranged regularly, preferably equidistantly, in the peripheral face of the transfer wheel.

Preferably, the seats of the plurality of seats are arranged regularly, preferably equidistantly, in the peripheral face of the transfer wheel.

However, the seat modules and seats may also be arranged regularly but not equidistantly on the peripheral face of the wheel. For example, the seat modules and seats may be arranged in groups, for example in pairs, along the peripheral face of the wheel. The seats of the groups may have a same or may have different sizes. A group-like, for example pair-like or more general asymmetric arrangement of the seats on the peripheral face of the wheel is favourable for an asymmetric placement of objects in a product.

A seat module or a plurality of seat modules may be fixedly arranged in the transfer wheel. Alternatively, a seat module is removably mounted in a seat module cavity of the transfer wheel. This allows to replace a seat module without having to replace the transfer wheel. A seat module may be exchanged by a same or by a different seat module. For example, a different seat module may have a seat having a different shape or diameter, may have a different elasticity, or may be differently mounted.

Removably mounted seat modules may be held in a module cavity, for example by clamping, by screws, by suction or by magnetic forces, for example by an electromagnet.

According to the invention, there is also provided an apparatus for transferring objects, the apparatus comprising at least a transfer wheel according to the invention and as described herein. The apparatus may, for example, be used for transferring and introducing an object into a product. For example, the object may be introduced into a continuous flow of material, preferably a filter material as used in the manufacture of filters for smoking articles. The object may, for example, also be introduced into aerosol-generating articles for electronic devices. The object may, for example, be transferred and introduced into a cavity of an article or into a line of individual products such as individual rod-shaped products like filter elements or other elements of an aerosol-generating article.

In the apparatus, the transfer wheel may be arranged adjacent another transfer wheel for receiving the object from the other transfer wheel or for transferring the object to the other transfer wheel. The other transfer wheel may also be a transfer wheel according to the invention comprising at least a resilient seat module.

In the apparatus, the transfer wheel may also be arranged adjacent an insertion location along a transport line of a product, for example a filter tow, for insertion of the object into the product, for example into the filter tow.

According to the invention there is provided a method for transferring objects. The method comprises an in-line adaption of a radial position of an object in a seat of a transfer wheel. Therefore, the method comprises providing a transfer wheel comprising a seat for receiving and accommodating an object. The method further comprises receiving a first object in the seat in a receiving location, transferring the first object to a transfer location and releasing the first object at the transfer location.

The first object has a first size.

The method further comprises receiving a second object in the seat in the receiving location. The second object has a second size. The second size is different to the first size. Preferably, two objects are different in size if their sizes deviate at least two percent in their largest extension. For example, two different objects are different if their largest diameters or, for example, their lengths differ by at least two percent. Yet a further step of the method comprises adapting the radial position of the seat such that a maximal extension of the transfer wheel defined by an outermost extension of the object on the seat is the same for each of the first or second object accommodated on the seat in at least one of the receiving location or the transfer location.

Thus, the compensation for the variation in size of the objects is automatically effected by a compression or expansion of the resilient seat module in the receiving location or in the transfer location or in both the receiving location as well as the transfer location.

If an object is inserted from the transfer wheel into a tow of filter material, an adaption may possibly not be required, for example, if an exact positioning of the object in a filter is not critical. For example, a compression force exerted onto the capsule by the insertion of the capsule into filter tow may not be high enough to compress a resilient seat module. Thus, an automatic adaption does not occur at the transfer location but may occur in a receiving location, where the object is received by the transfer wheel.

If an object is received by the transfer wheel, for example from a reservoir, an automatic adaption may not be required. Thus, no adaption occurs at a receiving location. However, if the object is transferred from the transfer wheel to another transfer or insertion wheel, adaption preferably occurs at the transfer location.

Typically also no adaption of a radial position of the seat in the seat module occurs if the changes in sizes of the objects have no influence on the outermost extensions of the objects when accommodated in the seat.

Preferably, the automatic adaption occurs in both, the receiving location and in the transfer location as soon as a compression force acts on the resilient seat module, which compression force is large enough to compress the resilient seat module. Preferably, automatic adaption of the position of the object on the transfer wheel also occurs between a receiving location and a transfer location. For example guide elements may exert a compression force via object onto the seat module such that a maximal extension of the transfer wheel is kept between receiving location and transfer location. Preferably, guide elements are arranged distanced to the circumference of the transfer wheel and along at least a portion of the circumference of the transfer wheel. Preferably, guide elements are stationary guide elements. Preferably, the method comprises adapting the position of the seat by compressing or expanding a resilient seat module comprising the seat. Preferably, compressing the resilient seat module is performed by pushing the first or second object into the direction of the seat. Via the object the seat module itself is compressed or the seat module is pushed back by compressing a module support.

Advantageously, the method comprises compressing the resilient seat module with a force smaller than a crushing force of the first object and of the second object.

In absence or removal of a compression force the resilient seat module becomes less stressed or relaxed. In a less stressed or relaxed state of the seat module, preferably the seat in the seat module adopts a maximum radially outwardly arranged position.

Preferably, the first and the second object have a spherical, ellipsoidal or lentil shape. Preferably, at least one of the first or second object is a capsule comprising a liquid, preferably a flavorant, for example menthol. Preferably, the first and the second objects are capsules containing a liquid.

The invention is further described with regard to embodiments, which are illustrated by means of the following drawings, wherein.

Figure 1:
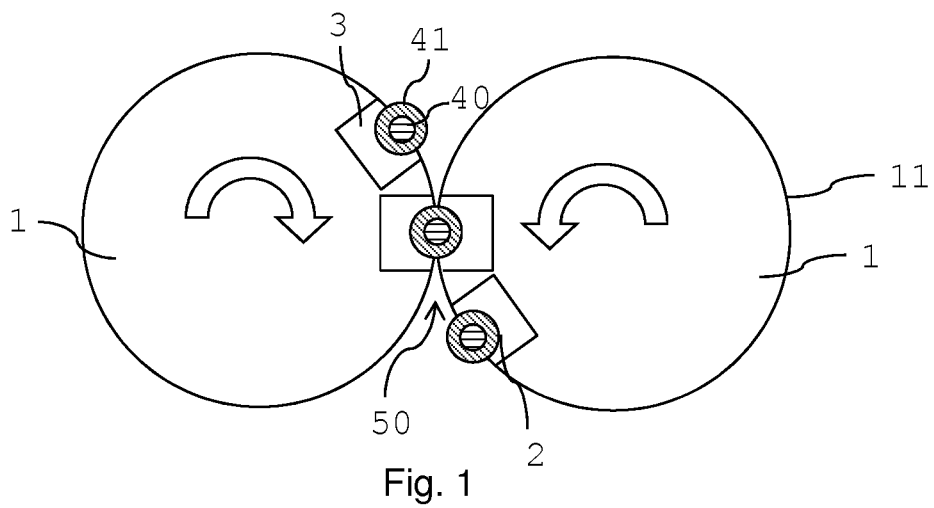
FIG. 1 illustrates a transfer of differently sized objects from wheel to wheel.

FIG. 1 illustrates a simplified cut view of two adjacently arranged transfer wheels 1 for the transfer of objects 40,41, for example capsules, from one transfer wheel to the neighbouring transfer wheel. Each transfer wheel 1 comprises seats 2 in its peripheral face. The seats 1 accommodate the objects 40,41 on the seats. The seats 2 have a size adapted to receive the corresponding object 40,41. As may be seen in FIG. 1, an object sits on the seat such that half of the volume of the object is accommodated on the seat. The other half of the object protrudes from the circumference of the transfer wheel 1.

Upon transfer of the objects, the protruding part of the object is accommodated on a seat 2 of the wheel receiving the object at a transfer location 50.

The transfer wheels 1 comprise seat modules 3 each comprising a seat 2. The seat modules may be fixedly arranged in the transfer wheel or may be removable as will be described in detail further below.

In FIG. 1 only two seat modules 3 are shown for each wheel 1. Each seat module is for illustration purposes shown comprising a large round object 41 and a small round object 40. The small and large objects differ, for example, by a few tenth to a few millimeter in diameter.

Depending on the size of the objects, here the diameters of the objects, the objects protrude more or less from the circumference of the transfer wheel 1.

Figure 2:
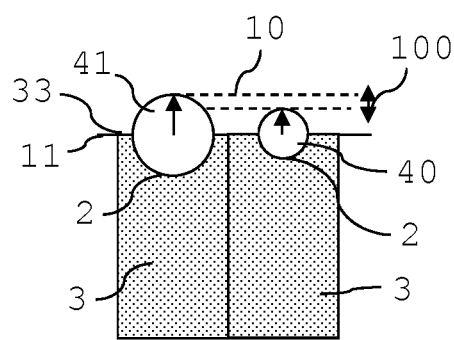
FIG. 2 shows two seat modules containing two differently sized objects.

This may be seen in more detail in FIG. 2. In FIG. 2 two seat modules 3 are drawn arranged side-by-side for better comparison.

Both seat modules comprise a seat 2 accommodating an object such that half of the object 40,41 protrudes from the top of the seat module. Therein the top of the seat module corresponds to the circumference 11 of the wheel. The circumference of the wheel is for simplicity reasons drawn as a plane.

As may be seen, depending on the size of the object, the large object 41 protrudes further from the seat module and from the circumference of the wheel 11 than the small object 40. Thus, a maximum radial extension of the transfer wheel 10 wherein the seats are filled with objects, varies in its radial position depending on the sizes of the objects in the seats. This difference is indicated by arrow 100. The difference 100 corresponds to the difference between the object radii of the two objects 40,41.

Thus, when changing from an application using small objects 40 to an application using large objects 41, the transfer wheels need to be exchanged. Two wheels having seat modules with small seats need to be exchanged by two wheels having seat modules with large seats.

However, the relative position of the two wheels remains unchanged. Thus, a space in between the wheels at the transfer location 50 or between seats of the wheels remains unchanged. The space may be sufficient for transferring a range of differently sized objects. In particular, if always half of the objects are transferred between wheels, no further changes to an apparatus may be required.

However, the space between wheels may not be sufficient for objects larger than a certain threshold to be transferred. The space may also be too large for small objects to be transferred such that the small objects might get lost upon transfer. For example, a suction mechanism applied to a seat 2 may not be sufficient to suck the small object onto the seat. In particular, if a position of an object has to remain constant, for example an insertion depth of an object for example into a cavity of a filter or into a tow of filter material, or may not protrude further from the wheel in order not to get touched or damaged by other device parts, a maximum radial extension 10 has to remain constant.

Figure 3:
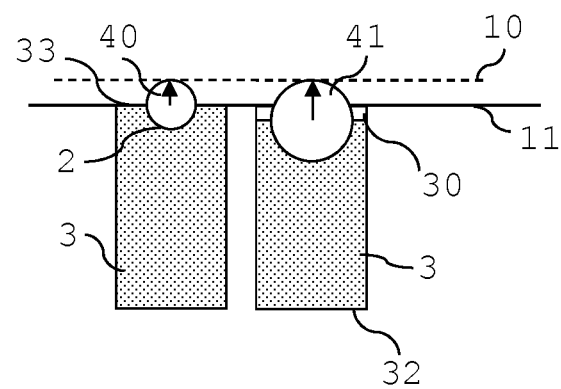
FIG. 3 shows a resilient seat module containing two differently sized objects.

In FIG. 3 two seat modules 3 are drawn arranged side-by-side for better comparison. The circumference of the wheel 11 is for simplicity reasons drawn as a plane.

Both seat modules comprise a bowl-shaped seat accommodating an object such that half of the object 40,41 protrudes from the top 33 of the seat module. In the drawing on the left, the seat module accommodates a small object 40. The top 33 of the seat module corresponds to the circumference 11 of the wheel.

In the drawing on the right, the seat module 3 accommodates a large object 41. The top 33 of the seat module is arranged in a retracted position relative to the circumference 11 of the wheel.

The seat module 3 is compressed by an amount 30 corresponding to the radius difference 100 between the small and the large object. This amount 30 compensates for the larger size of the object 41. Thus, the maximum radial extension 10 of the wheel is the same independent if the small or the large object 40, 41 is accommodated on the seats.

Also in FIG. 3 the large object protrudes further from the seat module than the small object. But a maximum radial extension 10 of the transfer wheel wherein the seats 2 are filled with objects is kept constant for the differently sized objects on the seats.

The resilient seat module 3 may, for example, be made of an elastic material, for example, a sponge material, preferably a plastic or polymer material. Thus, with a pressure exerted onto the object 41 into the direction of the seat, the object 41 is pushed and pushes via the seat onto the elastic material of the resilient seat module 3.

In the example of FIG. 3, the bottom 32 of the seat module is at a same radial position.

Figures 4, 5:
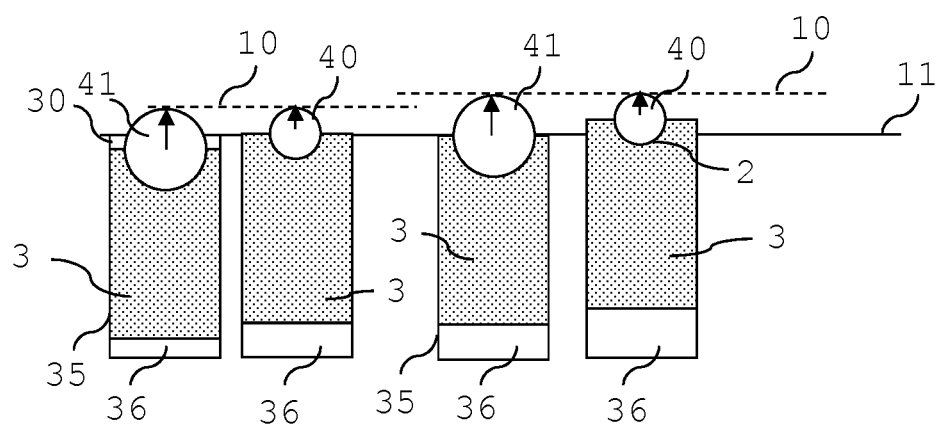
FIG. 4 shows an embodiment of a resilient seat module.
FIG. 5 shows another embodiment of a resilient seat module.

In FIG. 4 another embodiment of a resilient seat module is shown. Again, the circumference 11 of the wheel is for simplicity reasons drawn as a plane.

The seat module 3 is smaller than a depth of a cavity 35 the seat module is arranged in. This may be due to an already partially compressed seat module or due to the seat module in a relaxed state having a length smaller than the depth of the cavity. The seat module 3 is compressibly mounted. The seat module comprises a spring element 36 arranged between the bottom 32 of the seat module 3 and the bottom of the cavity. In FIG. 4 left, the spring module is compressed such that the maximum radial extension 10 with a large object 41 accommodated on the seat of the module adopts a desired value and defines the maximal radial extension for this application. In the seat module on the right side of FIG. 4, a small object 40 is accommodated in the seat of the seat module 3. Thus, the spring element 36 passes in a less stressed state or in a relaxed state. The seat module 3 is thus pushed radially outwardly in a circumferential direction such that the top of the seat module corresponds to the circumference 11 of the wheel. The maximal radial extension 10 is the same also for the small object 40.

In FIG. 5 yet another embodiment of a resilient seat module is shown with the circumference 11 of the wheel for simplicity reasons drawn as a plane.

In this embodiment, the seat module is resiliently mounted by a spring element 36. The seat module 3 and spring element 36 are mounted such that the top of the seat module corresponds to the circumference of the wheel 11 when the large object 41 is accommodated on the seat as shown in the left drawing of FIG. 5.

When a small object is accommodated in the seat of the seat module 3, the spring element 36 is extended and pushes the seat module slightly out of the cavity 35. This is done until the maximal radial extension 10 is the same for the small object as for the large object.

In both applications of FIG. 4 and FIG. 5 half of the volume of the objects is accommodated in the seat. The other half of the volume is extending from the seat. However, different portions of this other half is protruding from the circumference of the wheel depending on the size of the maximum radial extension 10.

Figure 6:
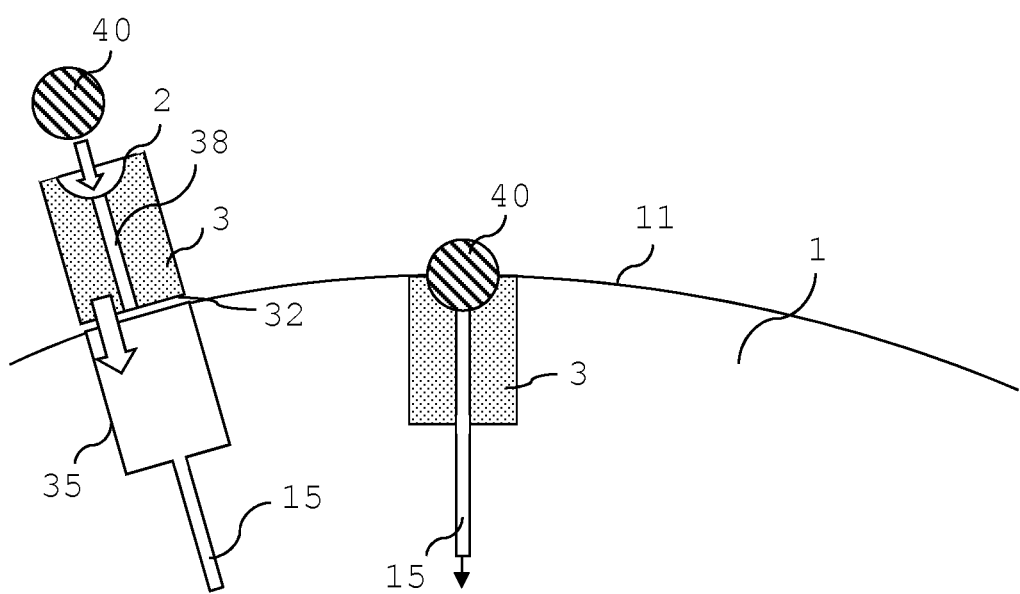
FIG. 6 shows a transfer wheel comprising removable seat modules.

In FIG. 6 a wheel 1 comprising cavities 35 for receiving seat modules 3 is shown. The seat modules 3 are replaceable seat modules and are removably mounted in the cavities. The seat modules are held in the cavities by releasable attachment means, for example, screws, magnets, suction or other suitable attachment means.

The seat modules are, for example, cylindrical seat modules 3 arranged in cylindrical cavities 35.

The seat modules comprise a seat 2 forming a recess in the seat modules. The seat modules are arranged in the wheel such that the seats are arranged in the peripheral face of the wheel.

The seat modules comprise an air passage 38 passing from the seat 2 to the bottom 32 of the seat module 3. The wheel 1 comprises air passages 15 from the bottom of the cavities to, for example, a central orifice and vacuum port in the center of the wheel.

Through the vacuum port and air passages 15,38 suction is applied to maintain the objects 40 on the seats of the seat module and on the wheel, accordingly. In a transfer location, suction may be interrupted to allow release and transfer of the objects 40.

Preferably, removable and non-removable seat modules are provided with air passages to provide suction to the seats for maintaining objects on the seats.

The invention claimed is:

1. A method for transferring capsules comprising an in-line adaption of a radial position of a capsule in a seat of a transfer wheel, comprising:
   providing a transfer wheel comprising a seat for receiving and accommodating a capsule;
   receiving a first capsule on the seat in a receiving location, the first capsule having a first size;
   transferring the first capsule to a transfer location and releasing the first capsule at the transfer location;
   receiving a second capsule on the seat in the receiving location, the second capsule having a second size, the second size being different to the first size; and
   adapting the radial position of the seat such that a maximum radial extension of the transfer wheel defined by an outermost extension of the capsule on the seat is the same for each of the first or second capsule accommodated on the seat in at least one of the receiving location or the transfer location; therein adapting the position of the seat by compressing or expanding a resilient seat module comprising the seat, thereby compressing the seat module itself or pushing back the seat module by compressing a module support;
   wherein, the transfer wheel comprises at least a seat module, the seat module comprising a seat located at the peripheral face of the transfer wheel and adapted for accommodating a capsule on the seat, wherein the at least one seat module is an elastically mounted resilient seat module or an elastically compressible resilient seat module, wherein a position of the seat of the seat module is adaptable in radial direction of the transfer wheel, and wherein the seat is a cup-shaped recess in the seat module.

2. The method according to claim 1, wherein the method comprises:
compressing the resilient seat module by pushing the first or second capsule into the direction of the seat.

3. The method according to claim 1, wherein the method comprises:
compressing the resilient seat module with a force smaller than a crushing force of the first capsule and of the second capsule.

4. The method according to claim 1, wherein the method comprises:
compressing the resilient seat module with a force between 1 Newton and 10 Newton.

5. The method according to claim 1, wherein the first capsule and the second capsule have a spherical, ellipsoidal, or lentil shape.

6. The method according to claim 1, wherein at least one of the first or second capsule is a capsule containing a liquid.

7. The method according to claim 1, wherein a compression force of the resilient seat module is between 1 Newton and 10 Newton.

8. The method according to claim 1, wherein a seat diameter of a seat is between 1 millimeter and 8 millimeter.

9. The method according to claim 1, comprising a central orifice and at least a passage in communication with the central orifice and the peripheral face of the transfer wheel, the transfer wheel further having a vacuum port in communication with the seat via the at least one passage for applying suction to the seat.

10. The method according to claim 1, comprising a plurality of seat modules, each seat module of the plurality of the seat modules comprising a seat for accommodating a capsule on the seat.

11. The method according to claim 1, wherein the seat module is removably mounted in a seat module cavity.

12. An apparatus for transferring capsules-according to a method for transferring capsules comprising an in-line adaption of a radial position of a capsule in a seat of a transfer wheel, comprising:
providing a transfer wheel comprising a seat for receiving and accommodating a capsule;
receiving a first capsule on the seat in a receiving location, the first capsule having a first size;
transferring the first capsule to a transfer location and releasing the first capsule at the transfer location;
receiving a second capsule on the seat in the receiving location, the second capsule having a second size, the second size being different to the first size; and
adapting the radial position of the seat such that a maximum radial extension of the transfer wheel defined by an outermost extension of the capsule on the seat is the same for each of the first or second capsule accommodated on the seat in at least one of the receiving location or the transfer location; therein adapting the position of the seat by compressing or expanding a resilient seat module comprising the seat, thereby compressing the seat module itself or pushing back the seat module by compressing a module support;
wherein, the apparatus comprises a transfer wheel comprising at least a seat module, the seat module comprising a seat located at the peripheral face of the transfer wheel and adapted for accommodating a capsule on the seat, wherein the at least one seat module is an elastically mounted resilient seat module or an elastically compressible resilient seat module, wherein a position of the seat of the seat module is adaptable in radial direction of the transfer wheel, and wherein the seat is a cup-shaped recess in the seat module.

13. The apparatus according to claim 12, wherein the method comprises:
compressing the resilient seat module by pushing the first or second capsule into the direction of the seat.

14. The apparatus according to claim 12, wherein the method comprises:
compressing the resilient seat module with a force smaller than a crushing force of the first capsule and of the second capsule.

15. The apparatus according to claim 12, wherein the method comprises:
compressing the resilient seat module with a force between 1 Newton and 10 Newton.

16. The apparatus according to claim 12, wherein the first capsule and the second capsule have a spherical, ellipsoidal, or lentil shape.

17. The apparatus according to claim 12, wherein at least one of the first or second capsule is a capsule containing a liquid.

* * * * *